ated May 8, 1962

3,033,684
BLACKSTRAP MOLASSES PRODUCT
Robert M. Winn, Bonham, Tex., assignor to Blackstrap Dry, Inc., Laurel, Miss., a corporation of Delaware
No Drawing. Filed Jan. 12, 1960, Ser. No. 1,873
9 Claims. (Cl. 99—6)

This invention relates to products or compositions containing blackstrap molasses.

While blackstrap molasses has other uses, probably its greatest potential is as an ingredient of livestock feeds. Unfortunately, the molasses at ordinary temperatures is a liquid which is both very viscous and highly hygroscopic. Difficult to handle as such, the molasses, were its viscosity the only problem, could be made available as a readily handleable dry feed by mixing it with meal or other suitable comminuted solid. However, the molasses is so hygroscopic that, even if dehydrated before mixing, it soon picks up moisture from the atmosphere and converts the mixture into a practically unuseable, sticky mass, resembling the molasses itself in consistency.

With blackstrap molasses a cheap by-product of sugar manufacturing, as well as a beneficial foodstuff for livestock, its production in a non-hygroscopic form has long been a goal of the feed industry. Thus far the goal is not known ever to have been reached commercially, nor do the patented attempts to reach it appear particularly feasible. This goal is reached by this invention and in a manner well-suited, economically, for commercial use.

It therefore is the primary object of the present invention to provide a livestock feed which is non-hygroscopic despite containing blackstrap molasses.

Another object of the invention is to provide a non-hygroscopic livestock feed having as its principal ingredients blackstrap molasses and a substance of high protein content.

An additional object of the invention is to provide a non-hygroscopic livestock feed formed of a mixture composed mainly of blackstrap molasses and a high protein substance and containing one or more additives which not only render the mixture non-hygroscopic but act synergistically to increase its protein content.

A further object of the invention is to provide a dry, non-hygroscopic form of blackstrap molasses.

Other objects and advantages of the invention will appear hereinafter in the detailed description and be particularly pointed out in the appended claims.

The product or composition of this invention is a mixture or material, which, in the form preferred for use as a livestock feed, is comprised or composed principally or mainly of two ingredients or constituents. One of these is blackstrap molasses which may but need not necessarily be dehydrated before being incorporated in the mixture. The other principal ingredient is a comminuted substance having a high protein content, such as soybean, cottonseed, corn or other meal, cottonseed bulk or chopped hay, or a mixture of two or more such substances.

While the above principal ingredients might be mixed together to form a dry mixture by preliminarily dehydrating at least the molasses, the mixture would soon absorb moisture from the atmosphere and deteriorate into a sticky, useless mass because of the hygroscopic character of the molasses. Wherefore, if a mixture of the principal ingredients is to have any practical value as a livestock feed, it must, somehow, be rendered non-hygroscopic. This is accomplished in accordance with the present invention by adding to and mixing with the principal ingredients one and preferably two minor ingredients, constituents or additives. The essential additive is tapioca and the desirable additive saponin, the former in its usual commercial form and the latter preferably pure but permissively of commercial grade.

Of the two additives, tapioca is the one responsible for rendering the mixture non-hygroscopic, even a quantity of less than 0.5% of the total mixture ordinarily sufficing for the purpose and being effective even though neither of the principal ingredients is dehydrated before mixing. In the latter case, the tapioca itself causes the mixture to dry progressively as the mixing proceeds to the point where, after thorough mixing or commingling of the ingredients, there is obtained an intimate or homogeneous, finely comminuted mixture of granular or other form depending on the form of the protein-containing substance. Initially dry, this mixture is non-hygroscopic and will remain dry for a considerable period even if exposed directly to the elements and indefinitely if bagged and stored under cover. This phenomenon appears to be due to the coating of each particle of the mixture with a fine film or coating of tapioca.

Of the other additive, saponin, as little as 1 part to 50 parts by weight of the tapioca ordinarily is sufficient. Even in such a minute quantity relative to the total mixture, the saponin has two very beneficial effects. For one, it accelerates the drying during mixing and, if desired, permits the amount of tapioca present to be reduced by as much as one-half. Its other effect is a synergistic action, judged to be due to a breaking up of the gums in the molasses, which greatly increases the protein content of the final mixture relative to the starting materials, typical increases ranging from around 40% to over 100%.

While to constitute a complete livestock feed, the mixture of this invention will ordinarily contain a high protein substance as one of its principal ingredients, a dry, non-hygroscopic blackstrap molasses, itself, is useful as a readily handleable ingredient of feeds and other products. Such a molasses is produceable in accordance with this invention by adding the tapioca or both additives to the molasses alone. In this case the quantity of either additive will be of the same relative order as that used in the molasses-protein substance mixture. The product or final mixture is principally or essentially molasses in a dry, finely divided or comminuted form in which it is non-hygroscopic and, if saponin was added, also has a substantial protein content. However, here, the additives cannot be depended on from drying and the molasses must be dehydrated by heating under partial vacuum or other means suitable for dehydrating the molasses without deleterious effect upon its solidus content. Since the dehydrating ordinarily will have no adverse effect on either additive, one or both may be mixed with the molasses either before or after the latter has been dehydrated.

As previously mentioned, the livestock feed of this invention in its preferred molasses-high protein form, may be produced or formed by thoroughly mixing in a suitable mixer to the point of dryness, undehydrated molasses and a high protein substance in the presence of quantities of tapioca and saponin so small relative to the total mixture as to add but little to the cost of the raw materials. If only tapioca is added, its quantity by weight should be around 1% of the total mixture. However, by adding saponin up to the ordinarily sufficient maximum of around 0.008% by weight of the total mixture, the quantity of the tapioca required for the non-hygroscopic product can be reduced to somewhat less than 0.4% at which its ratio to the saponin will be about 50:1.

Examples of mixtures from which the preferred, non-hygroscopic molasses-high protein feed may be formed, are the following:

*Example I*

| | Parts by weight |
|---|---|
| Blackstrap molasses | 560 |
| Soybean meal | 140 |
| Tapioca | 2.5 |
| Saponin (pure) | 0.05 |

*Example II*

| | Parts by weight |
|---|---|
| Blackstrap molasses | 560 |
| Sweet potato meal | 140 |
| Tapioca | 2.5 |
| Saponin (pure) | 0.05 |

The above examples in which the relative percentages of the several ingredients are the same, were selected, not as evidencing that this sameness must always obtain, which of course is not true, but rather as exemplifying in the quantitative analyses of their products the range of gain in protein content derived from the synergistic action of the saponin. These analyses, indicating the gain to be 42.3% in the first example and 101.2% in the second, are as follows:

| | Protein theoretical | Actual | Gain | Fat | Fibre | Moisture | Ash | Nitrogen free extract |
|---|---|---|---|---|---|---|---|---|
| Ex. I | 10.4 | 14.6 | 4.4 | 0.5 | 1.8 | 10.7 | 8.7 | 63.7 |
| Ex. II | 3.02 | 6.6 | 3.58 | 0.2 | 11.8 | 13.9 | 8.0 | 59.5 |

From the above detailed description it will be apparent that there has been provided a product which is inexpensive to produce and, while having blackstrap molasses as its principal or one of its principal ingredients, is dry and non-hygroscopic so that it is readily handleable and can be kept for protracted periods without deteriorating.

Having now described my invention, I claim:

1. A product comprising a dry, non-hygroscopic mixture including blackstrap molasses as a principal ingredient and tapioca as a minor ingredient.

2. A product comprising a dry, non-hygroscopic mixture including blackstrap molasses as a principal ingredient and tapioca and saponin as minor ingredients.

3. A product comprising a dry, non-hygroscopic mixture including blackstrap molasses and a high protein substance as principal ingredients and tapioca as a minor ingredient.

4. A product comprising a dry, non-hygroscopic mixture including blackstrap molasses and a high protein substance as principal ingredients and tapioca and saponin as minor ingredients.

5. A product comprising a dry, non-hygroscopic mixture including principally dehydrated blackstrap molasses and a small percentage of tapioca.

6. A product comprising a dry, non-hygroscopic mixture including principally dehydrated blackstrap molasses and small percentages of tapioca and saponin.

7. A product comprising a dry, non-hygroscopic mixture including principally dehydrated blackstrap molasses and small percentages of tapioca and saponin, the combined percentages of tapioca and saponin being not over about 1% by weight of the total mixture.

8. A product comprising a dry, non-hygroscopic mixture including principally dehydrated blackstrap molasses and small percentages of tapioca and saponin, the combined percentages of tapioca and saponin being not over about 1% by weight of the total mixture and the ratio of tapioca to saponin being about 50:1.

9. A product comprising a dry, non-hygroscopic, homogeneous, comminuted mixture including blackstrap molasses, a high protein substance and small percentages of tapioca and saponin.

References Cited in the file of this patent

UNITED STATES PATENTS

| 2,113,034 | Rowland et al. | Apr. 5, 1938 |
| 2,253,319 | Batterman | Aug. 19, 1941 |
| 2,788,276 | Reich et al. | Apr. 9, 1957 |

OTHER REFERENCES

"Uses and Applications of Chemicals and Related Materials," by Gregory, Reinhold Publishing Corporation, 330 West Forty-Second Street, New York, page 513.